(12) United States Patent
Shrestha

(10) Patent No.: US 9,680,528 B2
(45) Date of Patent: Jun. 13, 2017

(54) COMMUNICATION BETWEEN CAPACITIVE-ISOLATED DEVICES

(71) Applicant: NXP B.V., Eindhoven (NL)

(72) Inventor: Rameswor Shrestha, Eindhoven (NL)

(73) Assignee: NXP B.V., Eindhoven (NL)

( * ) Notice: Subject to any disclaimer, the term of this patent is extended or adjusted under 35 U.S.C. 154(b) by 11 days.

(21) Appl. No.: 14/526,128

(22) Filed: Oct. 28, 2014

(65) Prior Publication Data

US 2016/0119030 A1    Apr. 28, 2016

(51) Int. Cl.
| | | |
|---|---|---|
| H04L 27/00 | (2006.01) | |
| H04B 5/00 | (2006.01) | |
| H04L 25/02 | (2006.01) | |

(52) U.S. Cl.
CPC .......... *H04B 5/0012* (2013.01); *H04B 5/005* (2013.01); *H04L 25/0266* (2013.01)

(58) Field of Classification Search
None
See application file for complete search history.

(56) References Cited

U.S. PATENT DOCUMENTS

| | | | |
|---|---|---|---|
| 5,533,053 A | | 7/1996 | Hershbarger |
| 7,724,063 B1 * | | 5/2010 | Chang ..................... H03F 3/005 |
| | | | 327/337 |
| 8,571,093 B1 | | 10/2013 | Van de Beek |
| 8,693,528 B1 | | 4/2014 | Shrestha et al. |
| 8,867,592 B2 | | 10/2014 | Shrestha |
| 2008/0191685 A1 * | | 8/2008 | Dhuyvetter ............... H03K 7/08 |
| | | | 324/118 |
| 2009/0017773 A1 * | | 1/2009 | Dupuis ............... H04L 25/0268 |
| | | | 455/73 |
| 2009/0206960 A1 | | 8/2009 | Ng et al. |
| 2009/0243028 A1 * | | 10/2009 | Dong ..................... H01L 23/66 |
| | | | 257/499 |
| 2009/0295451 A1 | | 12/2009 | Jordanger et al. |
| 2010/0052826 A1 * | | 3/2010 | Callahan ............. H01L 25/0655 |
| | | | 333/24 R |

(Continued)

OTHER PUBLICATIONS

U.S. Appl. No. 13/904,879, Shrestha.

(Continued)

*Primary Examiner* — Shuwang Liu
*Assistant Examiner* — Gina McKie
(74) *Attorney, Agent, or Firm* — Rajeev Madnawat

(57) ABSTRACT

Aspects of the present disclosure are directed to circuits, apparatuses and methods for communicating data between capacitive-isolated devices. According to an example embodiment, an apparatus includes a transmitter circuit configured to transmit a first single-ended data signal over a first signal path. The apparatus also includes a receiver circuit. The receiver circuit includes a differential amplifier having a first input coupled to receive a second single-ended signal from a second signal path of the plurality of signal paths and includes a second input coupled to receive a reference signal from a third signal path of the plurality of signal paths. The differential amplifier outputs a third single-ended signal indicative of a voltage difference between the first and second inputs. The receiver circuit also includes a common mode suppression circuit configured to remove a common mode voltage from the first and second inputs of the differential amplifier.

18 Claims, 4 Drawing Sheets

(56) References Cited

U.S. PATENT DOCUMENTS

| | | | |
|---|---|---|---|
| 2011/0304391 A1* | 12/2011 | Meharry | H03F 3/602 330/195 |
| 2013/0202071 A1* | 8/2013 | Wei | H03D 7/165 375/350 |
| 2013/0279549 A1 | 10/2013 | Van De Beek | |
| 2013/0301690 A1 | 11/2013 | Shrestha | |
| 2014/0029143 A1* | 1/2014 | Lim | H03F 1/523 361/56 |
| 2014/0042301 A1* | 2/2014 | Van Blerkom | H04N 5/3575 250/208.1 |
| 2015/0263673 A1* | 9/2015 | Biel | A61B 5/04 600/372 |

OTHER PUBLICATIONS

Extended European Search Report for Patent Appln. No. 15190355.6 (Feb. 10, 2016).
Extended European Search report of EP Application No. 15190355, Feb. 2016.

* cited by examiner

COMMUNICATION BETWEEN CAPACITIVE-ISOLATED DEVICES

Aspects of the present disclosure relate to apparatuses, devices and methods involving communication interfaces useful for galvanic isolation in circuits.

Galvanic isolation has been used for a variety of different applications. For instance, galvanic isolation can be provided between multiple integrated circuit chips, which can be located within the same package or in different packages. Signals can be passed between the integrated circuits using galvanic isolation techniques. Different galvanic isolation techniques have various undesirable tradeoffs in properties such as, but not necessarily limited to, signal propagation delays, power consumption, pulse width distortion and carrier frequency requirements.

One type of galvanic isolation involves the use of differential signaling and capacitive coupling. Differential signaling translates a data signal into a pair of out-of-phase signals that are transmitted on respective signal paths. A receiver recovers the signal as a difference in voltages on the two conductive lines. The differentially transmitted signals can be modulated in a number of different manners in order to convey data. The capacitive coupling on each signal path acts as a means of blocking DC voltages and attenuating low-frequency signals while transmitting high-frequency signals. However, this approach requires two signal paths for each communication channel between the two voltage domains. For example, bi-directional communication (i.e., a first communication channel in a first direction and a second communication channel in a second direction) requires four signal paths along with respective capacitive coupling circuits for each of the signal paths.

Aspects of the present disclosure are directed to circuits, apparatuses and methods for communicating data between capacitive-isolated devices. According to an example embodiment, an apparatus includes a transmitter circuit configured to transmit a first single-ended data signal over a first one of a plurality of signal paths that provide capacitive isolation between two devices. The apparatus also includes a receiver circuit. The receiver circuit includes a differential amplifier having a first input coupled to receive a second single-ended signal from a second signal path of the plurality of signal paths and includes a second input coupled to receive a reference signal from a third signal path of the plurality of signal paths. The differential amplifier outputs a third single-ended signal indicative of a voltage difference between the first and second inputs. The receiver circuit also includes a common mode suppression circuit configured to remove a common mode voltage from the first and second inputs of the differential amplifier.

In another embodiment, a method is provided for communicating between capacitive-isolated devices. At a first one of the devices, a first single-ended signal is transmitted from a first one of the devices to a second one of the devices over a first signal path of a plurality of signal paths that provide capacitive isolation between the devices. At the first device a second single-ended signal from the second device over a second one of the signal paths. A common mode voltage is removed from the second signal path and a third one of the signal paths. A third single-ended output signal is generated based on a voltage difference between the second and third signal paths.

According to an example embodiment, an apparatus includes a first circuit means for transmitting a first single-ended data signal over a first one of a plurality of signal paths. The apparatus also includes a second circuit means for receiving a second single-ended data signal over a second one of the signal paths and a reference signal on a third one of the signal paths. The second circuit means removes a common mode voltage from the second and third signal paths and outputs a third single-ended signal indicative of a voltage difference between the second and third signal paths.

The above summary is not intended to describe each embodiment or every implementation of the present disclosure. The figures, detailed description and claims that follow more particularly exemplify various embodiments.

Aspects of the present disclosure may be more completely understood in consideration of the detailed description of various embodiments of the present disclosure that follows in connection with the accompanying drawings, in which.

Figure 1:
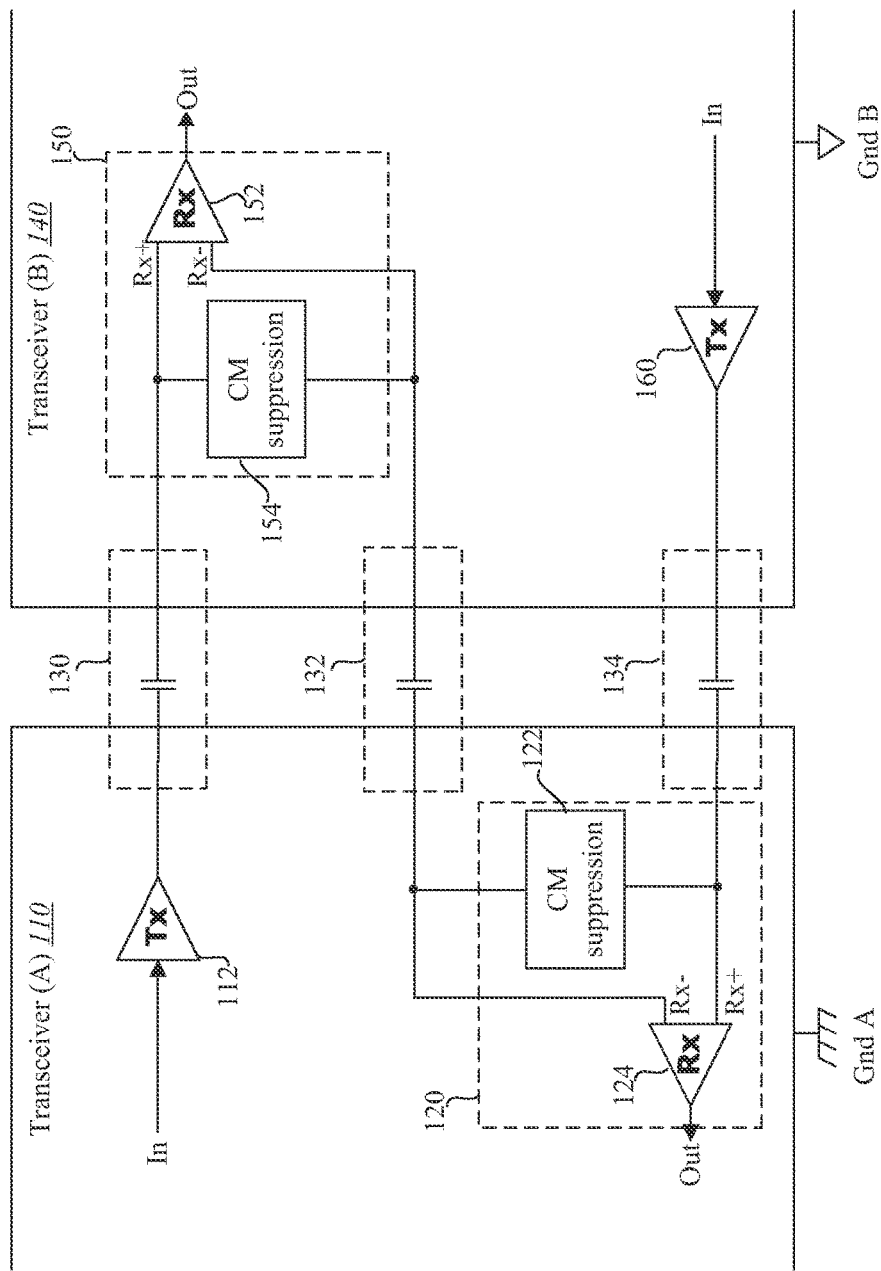
FIG. 1 depicts a first system for communication between different voltage domains, consistent with one of more embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

Embodiments of the present invention are believed to be applicable to communication methods, devices and systems involving multiple-conductive lines used for data communications between galvanically-isolated circuits. While the present invention is not necessarily limited in this context, various aspects of the invention may be appreciated through a discussion of related examples.

Aspects of the present disclosure relate to the transmission of data between devices that are galvanically isolated from each other. The circuits communicate using single-ended signaling (i.e., non-differential signaling) signal paths that provide capacitive isolation between the devices.

In some embodiments, a system includes first and second devices, which operate in respective voltage domains. The devices are communicatively coupled together and capacitive-isolated from one another by a set of signal paths. The first device includes a first transmitter configured to transmit a first single-ended data signal to the second device over a first one of the signal paths. The second device includes a second transmitter configured to transmit a second single-ended data signal to the first device over a second one of the signal paths. The first device includes a first receiver configured to receive the second single-ended signal from the second signal path and the second device includes a second receiver configured to receive the first single-ended signal from the first signal path. As the first and second devices are operated in respective voltage domains, the voltage of a received single-ended signal may not be determined with reference to a ground voltage in the voltage domain of the receiver.

In some embodiments, the receiver circuits are configured to adjust the received single-ended signals according to a reference signal communicated between the two devices, to compensate for voltage transients between the respective voltage domains. For example, in one implementation, each receiver includes a respective differential amplifier having a first input coupled to receive the single-ended signal and a second input coupled to receive the reference signal. The receiver also includes a respective common mode suppression circuit configured to remove common mode voltage exhibited by both the received single-ended signal and by the reference signal. As explained in more detail with reference to the figures, the common mode suppression circuit prevents the first terminal of the differential amp from floating or from exceeding the operation range of the receiver. During a voltage domain transient between the first and second devices, a current is induced on the signal paths between the first and second devices. The magnitude of the induced current on each signal path is proportional to the voltage transient and the isolation capacitance provided by the signal path. At the receiver, voltage on the signal paths is offset by the induced current. The common mode suppression circuit of each device removes the voltage offset resulting from the induced current, thereby compensating for the voltage transients between the voltage domains.

In different embodiments, the system may include various numbers of pairs of communication channels for bi-directional communication. For communication between two devices over N communication channels, the system includes 3*N/2 capacitive-coupled signal paths. For each bi-directional pair of communication channels (e.g., a first communication path in a first direction and a second communication path in the opposite direction), the system includes three capacitive-coupled signal paths. Two of the signal paths are used as single-ended (i.e., non-differential) signal paths. The third signal path is used to communicate a reference signal between the devices for suppression voltage disturbances between two voltage domains.

As this approach requires fewer signal paths (3*N/2 signal paths) for N channels, in comparison to differential signaling approaches (requiring 2N signal paths), fewer isolation capacitors are required. Accordingly, manufacturing costs and die space can be reduced. Some other approaches for communication between different voltage domains require even fewer signal paths and isolation capacitors. One such approach is described in U.S. Pat. No. 8,571,093 to Remco Van de Beek (titled, Communication Interface For Galvanic Isolation), which is fully incorporated by reference. However, these approaches require fully matched devices in compensation circuits in each of the two inputs of receiver. The matching of the compensation circuits is required to provide identical current paths from the received single-ended signals to ground in each voltage domain and improves suppression of voltage transients. Matching of components of different devices for communication can be difficult to coordinate and may increase manufacturing costs. Various disclosed embodiments provide a robust immunity to transient voltages that is more tolerant of transistor mismatch between devices, in comparison to the approach discussed in the Van de Beek patent.

For ease of explanation, the following examples may be primarily described with reference to a system providing two communication channels for bi-directional communication between two capacitive-isolated devices. However, the embodiments are not so limited and may be adapted to include additional pairs of communication channels.

Turning now to the figures, FIG. 1 depicts a block diagram of a system for communication between voltage domains, consistent with embodiments of the present disclosure. In this example, the system includes first and second transceiver circuits (110 and 140) configured for bi-directional communication over three signal paths (130, 132 and 134). Each signal path (130, 132 and 134) communicatively couples transceiver 110 and transceiver 140. In this example, each signal path (130, 132 and 134) includes one capacitor that capacitively isolates the transceiver 110 from transceiver 140. In some embodiments, the signal paths may include additional capacitors disposed in or connected to either or both of the transceivers 110 and 140 to increase the voltage withstanding capability between the grounds.

The first transceiver 110 includes a transmitter circuit 112 configured to transmit a first single-ended signal over a first one of signal paths 130. The second transceiver 140 includes a transmitter circuit 160 configured to transmit a second single-ended signal over a second one of signal paths 134. The signals input to the transmitter circuits 112 and 160, for transmission as single-ended signals, may have data encoded using various encoding techniques including, for example, on-off key modulation phase shift key, frequency shift key, pulse width modulation, pulse position modulation, Trellis modulation and spread spectrum modulation.

The first transceiver 110 includes a receiver circuit 120 configured to receive the second single-ended signal from the second one of the signal paths 134. The second transceiver 140 includes a receiver circuit 150 configured to receive the first single-ended signal from the first one of the signal paths 130. The receiver circuits 120 and 150 are configured to adjust the received single-ended signals based on using a reference signal communicated between the transceiver circuits 110 and 140 over a third signal path 132.

In this example, the receiver circuit 120 includes a differential amplifier 124 having a first input coupled to receive the single-ended signal from the second signal path 134 and a second input coupled to the third signal path 132. The differential amplifier 124 outputs a single-ended signal indicative of a difference between the first and second inputs of the differential amplifier 124. The receiver circuit 120 also includes a common mode suppression circuit 122 configured to remove common mode voltage present on both of the single-ended signal paths 132 and 134 connected to the inputs of the differential amplifier 124. Similarly, receiver circuit 150 includes a differential amplifier 152 having a first input coupled to receive the single-ended signal from the first signal path 130 and a second input coupled to the third signal path 132. The receiver circuit 150 also includes a common mode suppression circuit 150 configured to remove common mode voltage present on both of the single-ended signal paths 130 and 132 connected to the inputs of the differential amplifier 152.

As previously explained, during a voltage transient between voltage domains of the first and second devices, a current and voltage shift is induced on the signal paths 130, 132, and 134. By removing voltages from the single-ended signal paths 130 and 134 that are also present on single-ended signal path 132, the common mode suppression circuits 122 and 154 reduce the voltage shift and prevent voltages on the signal paths 130 and 134 from exceeding the operational ranges of the differential amplifiers 124 and 152.

In some implementations, the common mode suppression circuits 122 and 154 may not remove the entire common mode voltage during a large voltage transient. For example, the common mode suppression circuit 122 may suppress enough of the common mode voltage to bring the voltage of the signal path 134 within the operational range of the differential amplifier 124. The differential amplifier 124 outputs a signal indicating a voltage difference between signal paths 132 and 134, thereby removing the remaining common mode voltage.

Figure 2:
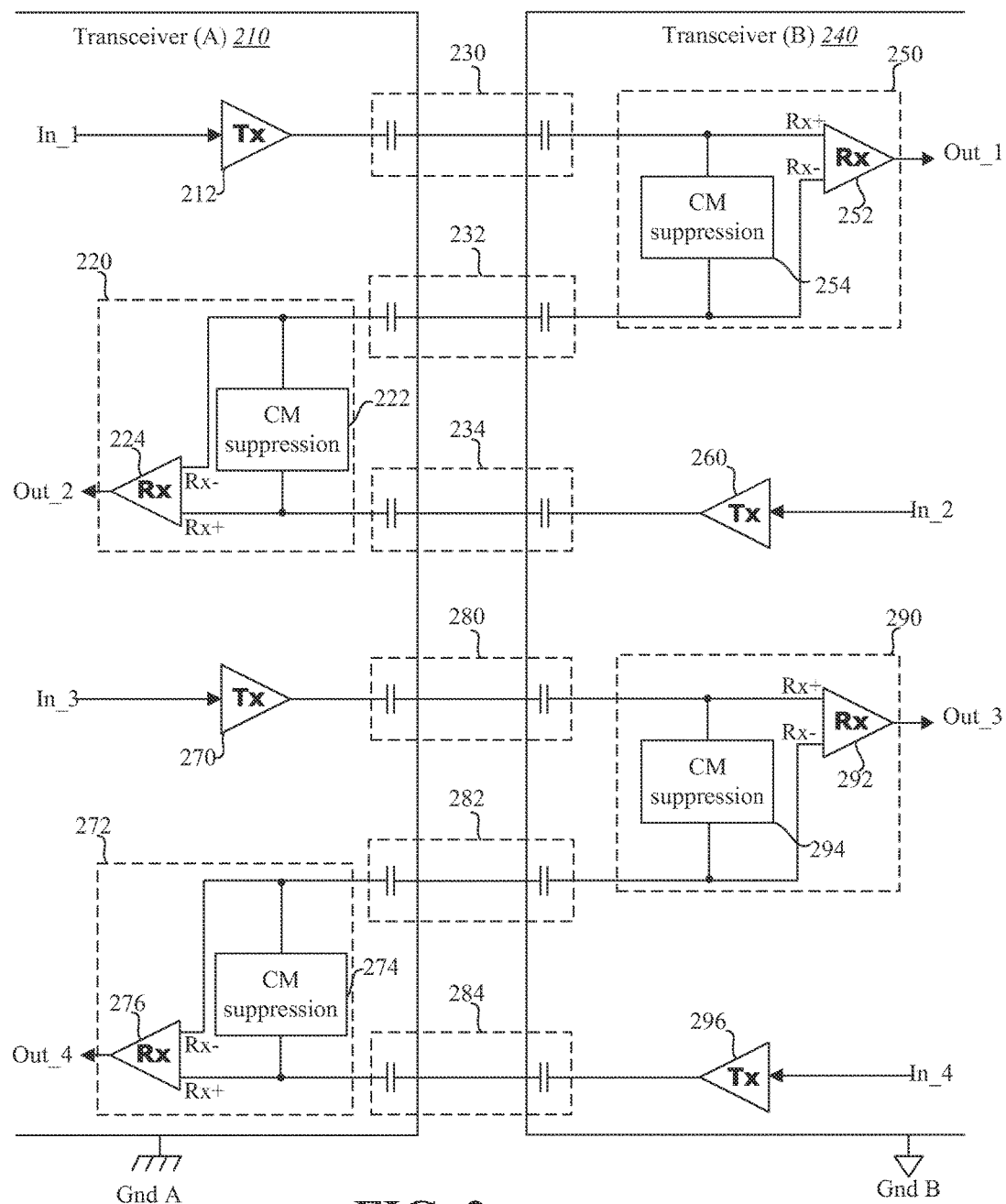
FIG. 2 depicts a second system for communication between different voltage domains with two communication channels in each direction, consistent with one of more embodiments of the present disclosure.

In some embodiments, the transceivers may be configured to communicate across voltage domains using additional pairs of communication channels for bi-directional communication. For example, FIG. 2 depicts a second system for communication between different voltage domains with two communication channels in each direction. The system includes first and second transceiver circuits 210 and 240. The transceiver circuits 210 and 240 include a first set of circuits 212, 220, 222, 224, 250, 252, 254 and 260, which provide a first pair of communication channels using signal paths 230, 232 and 234. The first set of circuits 212, 220, 222, 224, 250, 252, 254 and 260 are arranged and operate as described with reference to circuits 112, 120, 122, 124, 150, 152, 154 and 160 in FIG. 1. The first and second transceiver circuits 210 and 240 also include a second set of circuits 270, 272, 274, 276, 290, 292, 294 and 296, which that provide a second pair of communication channels using signal paths 280, 282 and 284. The second set of circuits 270, 272, 274, 276, 290, 292, 294 and 296 similarly operates as described with reference to circuits 112, 120, 122, 124, 150, 152, 154 and 160 in FIG. 1.

In this example, each of the signal paths 230, 232, 234, 280, 282 and 284 includes a signal line capacitively coupled to transceiver 210 by a first capacitor and capacitively coupled to transceiver 240 by a second capacitor. In some embodiments, the signal paths may be adapted to include only a single capacitor, as described with reference to signal paths 130, 132 and 134 in FIG. 1, or include additional capacitors.

Figure 3:
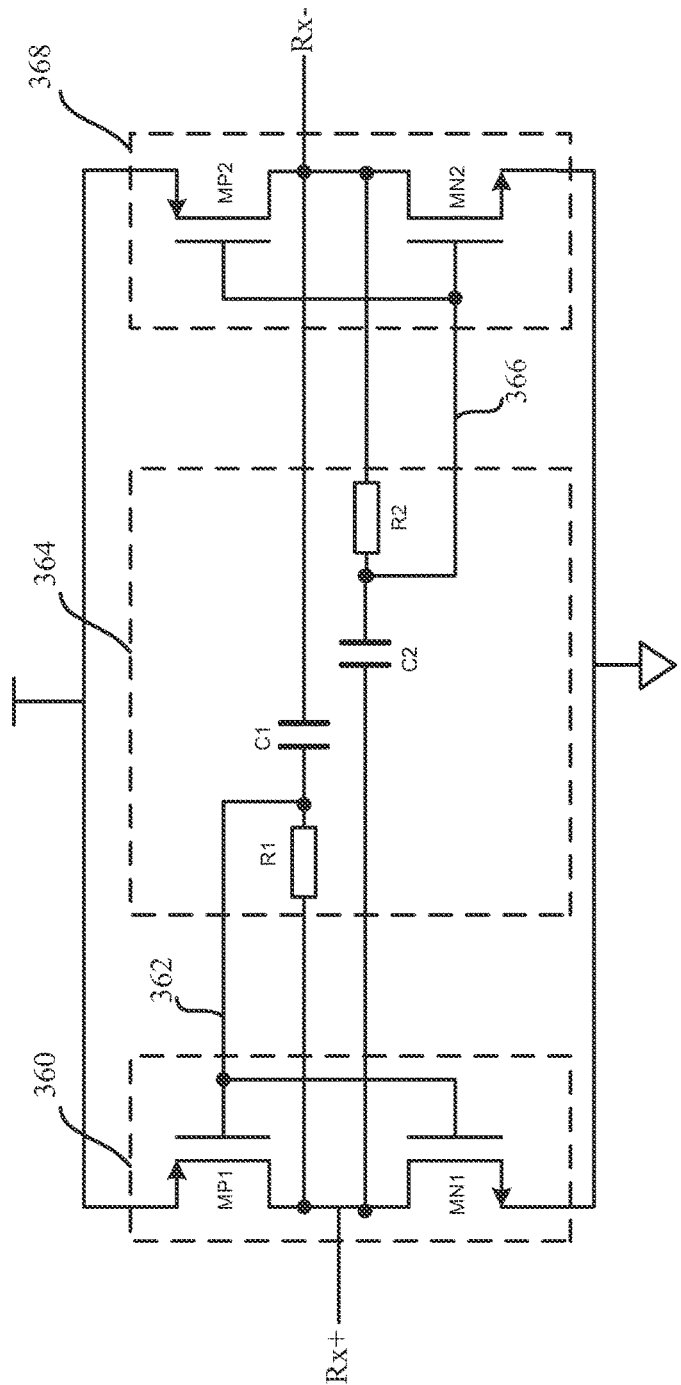
FIG. 3 shows a circuit that may be used to remove common mode voltage introduced by voltage transients, consistent with one of more embodiments of the present disclosure.

FIG. 3 shows a common mode suppression circuit which is fully balanced with respect to inputs Rx+ and Rx−, in accordance with one or more embodiments of the present disclosure. The circuit 300 may be used, for example, to implement the common mode suppression circuits shown in FIGS. 1 and 2. The common mode suppression circuit 300 includes a two common mode voltage adjustment (CMVA) 360 and 368 configured to adjust common mode voltage on a respective one of the signal paths (not shown) that are connected to inputs Rx+ and Rx−. The common mode suppression circuit 300 also includes a cross-coupling circuit 364 that causes the CMVA circuits 360 and 368 to remove common mode voltages from the respective signal paths. In this example, each CMVA circuit includes an inverter circuit having an output connected to a respective signal path. The inverter circuits includes impedance-adjustable current paths (e.g., FETs, MP1 and MN1) that are configured with the cross-coupling circuit 364 to provide low impedance paths (e.g., to sink common mode currents to ground) and provide a high impedance path for differential AC signaling. The respective FETs of each CMVA circuit (e.g., 360) have a respective impedance response that is matched with an impedance response of a corresponding FET of the other CMVA circuit (e.g., 368). The impedances are matched up to an impedance-tolerance specification. Due to the mismatch in impedances beyond the impedance-tolerance specification, CMVA circuits may pass slightly different amounts of current from respective signal paths in attempting to remove common mode voltages that may result in noise unless such differences are compensated for. The coupling circuit is configured to compensate for noise introduced by such mismatch.

In this example, each CMVA circuit (e.g., 360) includes two FETs (e.g., MP1 and MN1) connected in an inverter circuit arrangement, as shown in FIG. 3. The CMVA circuits 360 and 368 are each configured to adjust common mode voltage of a respective signal path in response to a respective control signal (e.g., at input nodes 362 and 366 of the CMVA circuits). In this example, the cross-coupling circuit 364 is configured to pass in-phase signals from inputs Rx+ and Rx− (e.g., connected to 130, 132 in FIG. 1) to the gate inputs of respective CMVA circuits 360 and 368 as the respective control signals (e.g., via 362 and 366). The cross-coupling circuit is configured to adjust the respective control signals to cause the corresponding FETs to operate with impedances that are matched beyond the impedance-tolerance specification. The cross-coupling circuit 364 is configured to be less dependent on impedance mismatch, beyond the impedance-tolerance specification, by cross-coupling the impedance differentials from each of the respective nodes through the AC coupling circuit and to another of the CMVA circuits.

The cross-coupling circuit 364 includes a capacitance-based circuitry (e.g., C1 and C2) for providing AC coupling via each of the plurality of AC signal paths. In this example, the cross-coupling circuit 364 includes first and second resistors and first and second capacitors. The first resistor R1 has a first end coupled to an input 362 of the first CMVA circuit 360 and a second end coupled to the output of the first CMVA circuit. The second resistor R2 has a first end coupled to an input 366 of the second CMVA circuit 368 and a second end coupled to the output of the second CMVA circuit. The first capacitor C1 has a first terminal coupled to the input 362 of the first CMVA circuit 360 and a second terminal coupled to the output (Rx−) of the second CMVA circuit 368. The second capacitor C2 has a first terminal coupled to the input 366 of the second CMVA circuit 368 and a second terminal coupled to the output (Rx+) of the first CMVA circuit 360.

In some embodiments, the cross-coupling circuit 364 is configured to pass signals in a frequency range to facilitate cancellation of signals ensuing from the impedance response of impedance-adjustable current paths of the plurality of CMVA circuits being mismatched beyond the impedance-tolerance specification. For instance, in high frequency data communication applications, differential data signals are located in high frequencies and common mode voltages are located at low frequencies. In some embodiments, the cross-coupling circuit 364 is configured to provide low frequency signals (e.g., common mode signals) to inputs of the CMVA circuits 360 and 368 to remove the common mode signals.

In some embodiments, the respective control signals provided by the cross-coupling circuit have voltage levels that differ by an amount proportional to an amount of impedance mismatch between the FETs of the CMVA circuits. In response to the difference in voltage levels of the control signals, the corresponding FETs exhibit impedances that are more closely matched. In this manner, noise resulting from mismatch beyond the impedance-tolerance specification is reduced.

The cross-coupling circuit may be modified as necessary for a particular application to further adjust the control signals provided to the inputs of the CMVA circuits. As one example, if a larger differential impedance between input nodes 362 and 366 is desired, size of C1 and C2 may be increased—thereby feeding back anti-phase RF signals to the input nodes.

For additional information regarding circuits for various common mode suppression circuits reference may be made to U.S. patent application Ser. No. 13/904,879 to Rameswor Shrestha (titled Apparatus For Common Mode Suppression); U.S. Pat. No. 8,867,592 to Rameswor Shrestha (titled Capacitive Isolated Voltage Domains); and U.S. Pat. No. 8,693,528 to Rameswor Shrestha (titled Common Mode Suppression Circuit), which are fully incorporated by reference herein.

Figure 4:
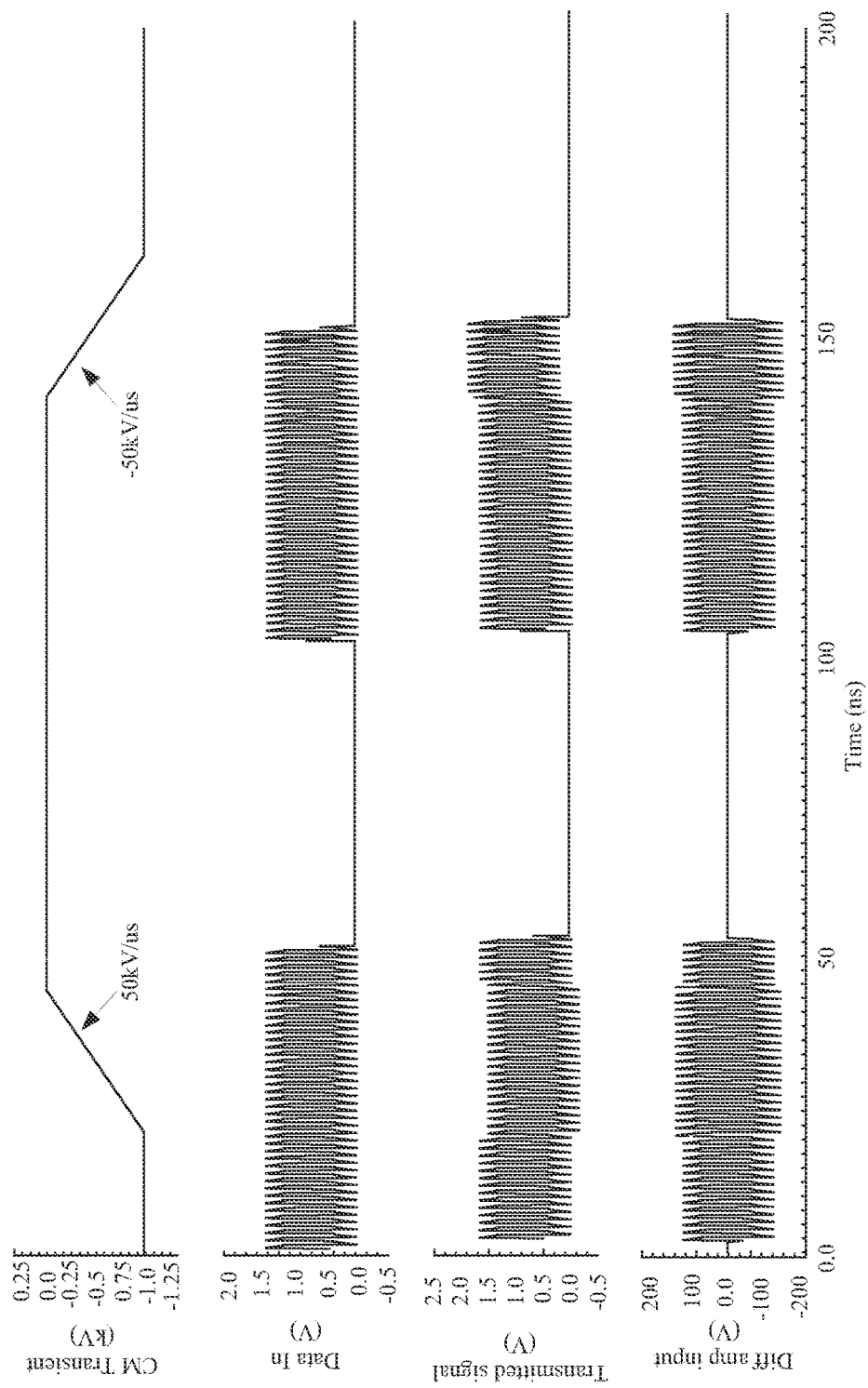
FIG. 4 shows an example set of waveforms that may be generated in the communicating of data signals between capacitive-isolated devices, consistent with one of more embodiments of the present disclosure.

FIG. 4 shows an example set of waveforms that may be generated in communicating of data signals between capacitive-isolated devices. The first waveform shows a difference between ground voltages of two communication circuits resulting from a voltage transient in one of the ground voltages. The second waveform shows an example data signal (Data In) that is input to a transmitter such as transmitter circuit 112 in FIG. 1. In this example, the data signal encodes a binary sequence 1010 using on-off key modulation. As previously indicated, the data signals to be transmitted may encode data using various encoding techniques. The third waveform shows the signal transmitted on a single-ended signal path. At approximately 25-45 ns, the first waveform exhibits at 50 kV/us transient, and causes voltage of the signal path at a receiver to decrease during this period. As shown in the third waveform, the common mode suppression circuit removes all but a small portion of the voltage shift. Similarly, at approximately 140-160 ns, the common mode suppression circuit removes all but a small portion of the voltage shift induced by the −50 kV/us transient. The fourth waveform shows a voltage difference between inputs of the differential amplifier (e.g., 152) in the receiver.

The embodiments are thought to be applicable to a variety of applications using galvanic isolation. Other aspects and embodiments will be apparent to those skilled in the art from consideration of the specification. Various blocks, modules or other circuits may be implemented to carry out one or more of the operations and activities as described herein and/or shown in the figures. In these contexts, a "block" (also sometimes "logic circuitry" or "module") is a circuit that carries out one or more of these or related operations/activities (e.g., signal transmission, signal reception, and/or common-mode suppression). For example, in certain of the above-discussed embodiments, one or more modules are discrete logic circuits or programmable logic circuits configured and arranged for implementing these operations/activities, as in the blocks shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. The disclosure may also be implemented using a variety of approaches such as those involving a number of different circuits, operating systems and/or software programs/packages.

Such modifications and changes do not depart from the true spirit and scope of the present disclosure, including that set forth in the following claims.

What is claimed is:

1. An apparatus for full-duplex communication of data signals between capacitive-isolated devices via three signal paths of a plurality of signal paths that provide capacitive isolation between the devices, comprising:
   a first transmitter circuit configured and arranged to transmit a first single-ended data signal over a first signal path of the three signal paths; and
   a first receiver circuit including
      a first differential amplifier
         having a first input coupled to receive a second single-ended signal from a second signal path of the three signal paths,
         having a second input coupled to receive a reference signal from a third signal path of the three signal paths, and
         being configured and arranged to output a third single-ended signal indicative of a voltage difference between the first and second inputs;
   a second transmitter circuit configured and arranged to transmit the second single-ended signal over the second signal path; and
   a second receiver circuit including a second differential amplifier having a third input coupled to receive the first single-ended signal via the first signal path and having a fourth input coupled to the third signal path, and being configured and arranged to output a fourth single-ended signal indicative of a voltage difference between the third and fourth inputs; and
   common mode suppression circuitry configured and arranged to remove a common mode voltage from the inputs of at least one of the differential amplifiers.

2. The apparatus of claim 1, wherein the common mode suppression circuitry is further configured and arranged with
   a first impedance path from the first input of the differential amplifier to a ground voltage, and
   a second impedance path from the second input of the differential amplifier to the ground voltage and that is balanced with the first impedance path.

3. The apparatus of claim 1,
   wherein the common mode suppression circuitry includes
      a first common mode suppression circuit configured and arranged to remove a common mode voltage from the first and second inputs of the differential amplifier, and a second common mode suppression circuit, configured and arranged to remove a common mode voltage from the third and fourth inputs.

4. The apparatus of claim 3, wherein:
   the first mentioned transmitter circuit and first mentioned receiver circuit operate in a first voltage domain; and
   the second transmitter circuit and second receiver circuit operate in a second voltage domain that is different from the first voltage domain.

5. The apparatus of claim 3, wherein
   the first common mode suppression circuit includes a first set of transistors the second common mode suppression circuit includes a second set of transistors that are not matched to the first set of transistors.

6. The apparatus of claim 3,
the first mentioned transmitter circuit and first mentioned receiver circuit are disposed on a first integrated circuit (IC) die; and
the second transmitter circuit and second receiver circuit are disposed on a second IC die.

7. The apparatus of claim 6, wherein each of the first, second, and third signal paths each include a respective first capacitor configured to provide a capacitive coupling between a first end of the signal path connected to the first IC die and a second end of the signal path connected to the second IC die.

8. The apparatus of claim 7, wherein each of the first, second, and third signal paths includes a respective first capacitor configured to provide a capacitive coupling between a first end of the signal path connected to the first IC die and a second end of the signal path connected to the second IC die.

9. The apparatus of claim 8, wherein
the first capacitor of each of first, second, and third signal paths is disposed on the first IC die; and
each of first, second, and third signal paths further include a respective second capacitor disposed on the second IC die and coupled in series with the respective first capacitor on the signal path.

10. The apparatus of claim 6, further comprising
fourth, fifth, and sixth signal paths;
a third transmitter circuit disposed on the first IC die and configured and arranged to transmit a fifth single-ended signal on the fourth signal path; and
a third receiver circuit disposed on the first IC die and including
a third differential amplifier having a fifth input coupled to the fifth signal path and a six input coupled to the sixth signal path; and
a third common mode suppression circuit, configured and arranged to remove a common mode voltage from the fifth and sixth inputs.

11. The apparatus of claim 10, further comprising
a fourth transmitter circuit disposed on the second IC die and configured and arranged to transmit a sixth single-ended signal on the fifth signal path; and
a fourth receiver circuit disposed on the second IC die and including
a fourth differential amplifier having a seventh input coupled to the fourth signal path and an eighth input coupled to the sixth signal path; and
a fourth common mode suppression circuit, configured and arranged to remove a common mode voltage from the fourth and sixth inputs.

12. A method for full-duplex communication between capacitive-isolated devices via three signal paths of a plurality of signal paths that provide capacitive isolation between the devices, comprising at a first device:
transmitting a first single-ended signal to a second device over a first signal path of the three signal paths that provide capacitive isolation between the devices;
receiving a second single-ended signal from the second device over a second signal path of the three signal paths;
removing a common mode voltage from the second signal path and a third signal path of the three signal paths; and
generating a third single-ended output signal based on a voltage difference between the second and third signal paths;
wherein a capacitive coupling circuit includes, for each of the first, second, and third signal paths, a respective first capacitor configured to provide a capacitive coupling between a first end of the signal path connected to a first IC die and a second end of the signal path connected to a second IC die, and wherein the respective first capacitor for each of first, second, and third signal paths is disposed on the first IC die; and
the capacitive coupling circuit further includes, for each of first, second, and third signal paths, a respective second capacitor disposed on the second IC die and coupled in series with the respective first capacitor on the signal path.

13. The method of claim 12, further comprising at the second device:
removing a common mode voltage from the first and third signal paths; and
generating a fourth single-ended output signal based on a voltage difference between the first and third signal paths.

14. The method of claim 13, wherein
the removing of common mode voltage from the second and third signal paths is performed using a first common mode suppression circuit including a first set of transistors; and
the removing of common mode voltage from the first and third signal paths is performed using a second common mode suppression circuit including a second set of transistors that are not matched to the first set of transistors.

15. The method of claim 12, further comprising communicating a reference signal between the first and second devices on a third signal path.

16. The method of claim 12, wherein the first device is operated in a first voltage domain and the second device is operated in a second voltage domain.

17. The method of claim 12, further comprising isolating the first device from the second device using a capacitive coupling circuit.

18. An apparatus for full-duplex communication between capacitive-isolated devices, each including a first IC die or a second IC die, using a plurality of signal paths and comprising:
first circuitry configured and arranged to transmit a first single-ended data signal over a first signal path of the plurality of signal paths; and
second circuitry configured and arranged
to receive a second single-ended data signal over a second signal path and a reference signal on a third signal path of the plurality of signal paths,
to remove a common mode voltage from the second and third signal paths; and
to output a third single-ended signal indicative of a voltage difference between the second and third signal paths, wherein the full-duplex communication is provided using a capacitive coupling circuit in the first, second and third signal paths, wherein the capacitive coupling circuit includes, for each of the first, second, and third signal paths, a respective first capacitor configured to provide a capacitive coupling between a first end of the signal path connected to the first IC die and a second end of the signal path connected to the second IC die, and wherein the respective first capacitor for each of first, second, and third signal paths is disposed on the first IC die; and the capacitive coupling circuit further includes, for each of first, second, and third signal paths, a respective second capacitor disposed on the second IC die and coupled in series with the respective first capacitor on the signal path.

* * * * *